UNITED STATES PATENT OFFICE.

GEORGE H. ALLEN, OF CLINTON, NEW YORK.

FURNITURE-POLISH.

1,309,171.      Specification of Letters Patent.      Patented July 8, 1919.

No Drawing.      Application filed May 28, 1917. Serial No. 171,547.

*To all whom it may concern:*

Be it known that I, GEORGE H. ALLEN, a citizen of the United States, and a resident of Clinton, in the county of Oneida and State of New York, have invented a new and useful Improvement in Furniture-Polish, of which the following is a specification.

My invention relates to improvements in compositions of matter which are especially designed for polishing furniture and it consists in the ingredients hereinafter named mixed in the manner described.

An object of my invention is to provide a furniture polish which when applied to furniture will clean the surface and leave the latter in a polished condition and which will also tend to render the varnish on the furniture more plastic and less liable to crack.

A further object of my invention is to provide a polish which does not require excessive rubbing to bring out the luster.

A further object of my invention is to provide a polish which flows readily and which will therefore cover a large amount of surface for a given quantity of polish as distinguished from the heavier polishes which tend to leave the article in tacky or otherwise abnormal condition.

A further object of my invention is to provide a furniture polish which is made of an aqueous extract of wood and which contains ingredients that render the polish particularly effective.

Other objects and advantages will appear in the following specification and the novel features of the invention will be particularly pointed out in the appended claims.

In carrying out my invention I may make use of any wood or a combination of woods such as oak, walnut, mahogany, etc. The wood is preferably reduced to a fine state, as for instance, saw dust. A quantity of the saw dust is then placed in water and boiled. The following will serve as an example of the method of making the polish, but it will be understood that this is for the purpose of illustration only, and that quite a latitude might be allowed in the proportions of the ingredients and in the manner of incorporating the same, without departing from the spirit and the scope of the invention.

As an example, four quarts of saw dust may be placed in ten gallons of water and boil for say an hour. This results in an aqueous extract of the wood, the extract being subsequently separated from the wood by filtration or decantation and mixed while hot with an oil, preferably a mineral oil but which may be any suitable oil. The proportions of the oil and the aqueous extract of wood may vary between wide limits, for I have found that it is sufficient if a small portion of the aqueous extract be present in the furniture polish, while on the other hand a large portion of the aqueous extract will not defeat the object of the invention but will produce a furniture polish which is superior to many now on the market, for instance, I can use successfully ten per cent. of the extract to ninety per cent. of the oil or I may increase the proportion of extract up to ninety per cent. and decrease the proportion of oil to ten per cent.

The oil and extract are stirred together and form a mixture somewhat in the nature of an emulsion. I attribute this to the fact that there is undoubtedly a gummy substance which is present in the aqueous extract.

In order to increase the detergent properties I add an alkali in the proportions of four pounds, for instance, of sal soda to fifteen gallons of the aqueous extract. A small proportion of wax preferably beeswax, say one to two pounds of beeswax to forty-five gallons of the finished product, gives to the polish a property of imparting a higher luster to the furniture.

In certain instances it may be advisable to use alcohol as an ingredient and when this is the case I prefer to use one gallon of alcohol to forty-five gallons of the finished product. The polish, however, is not dependent upon the use of alcohol. The polish may be colored by the use of anilin or other suitable coloring matter and may be given any characteristic odor with an odorous oil such as oil of mirbane or other suitable substance.

The polish which is produced as described above has certain peculiar properties which are not found in the ordinary polishes on the market. The main feature of the polish is its lasting quality. This appears to be due to the ingredients which are present in the aqueous extract of wood, presumably to certain gummy compounds whose nature is similar to those found in the gums which form the basis of varnishes. I have found by experience that the aqueous extract also contains ingredients which tend to render the varnish to which the polish is applied elastic, thus tending to preserve it and keep it from cracking and peeling.

There is not sufficient gum in the aqueous solution, however, to render the polish thick or to prevent its flowing well. The fact that it is comparatively limpid and that a small amount of it will cover a comparatively large surface also renders it highly desirable. The polish acts as a cleaning agent as well as a polishing agent and is particularly desirable in removing dust and imparting a luster at one operation.

I am aware that various polishing compositions consisting of wood products combined with oil have been made but such wood products are spirituous in their nature, such as oil of turpentine, oil of cedar, wood alcohol, grain alcohol, etc., and I therefore do not claim such broadly. The present invention relates more particularly to an aqueous extract of wood combined with oil.

I claim:—

1. A polishing composition comprising an extract of wood mixed with a mineral oil.

2. A polishing composition comprising an aqueous extract of wood mixed with a mineral oil.

3. A polishing composition comprising an alkaline aqueous extract of wood mixed with a mineral oil.

4. A polishing composition comprising an alakline aqueous extract of wood mixed with a mineral oil and beeswax.

5. A polishing composition comprising a mixture of aqueous extract of wood, sal soda, mineral oil, and beeswax.

6. A polishing composition comprising a mixture of aqueous extracts of wood, sal soda, mineral oil, beeswax and alcohol.

GEORGE H. ALLEN.